Dec. 23, 1952 — E. F. EGER ET AL — 2,622,554
APPARATUS FOR SPRAYING TERMINALS ONTO THE ENDS OF WOUND CONDENSERS
Filed March 30, 1950 — 5 Sheets-Sheet 1

INVENTORS
E. F. EGER
C. R. RASMUSSEN
BY
ATTY.

Dec. 23, 1952     E. F. EGER ET AL     2,622,554
APPARATUS FOR SPRAYING TERMINALS ONTO THE ENDS OF WOUND CONDENSERS
Filed March 30, 1950     5 Sheets-Sheet 2
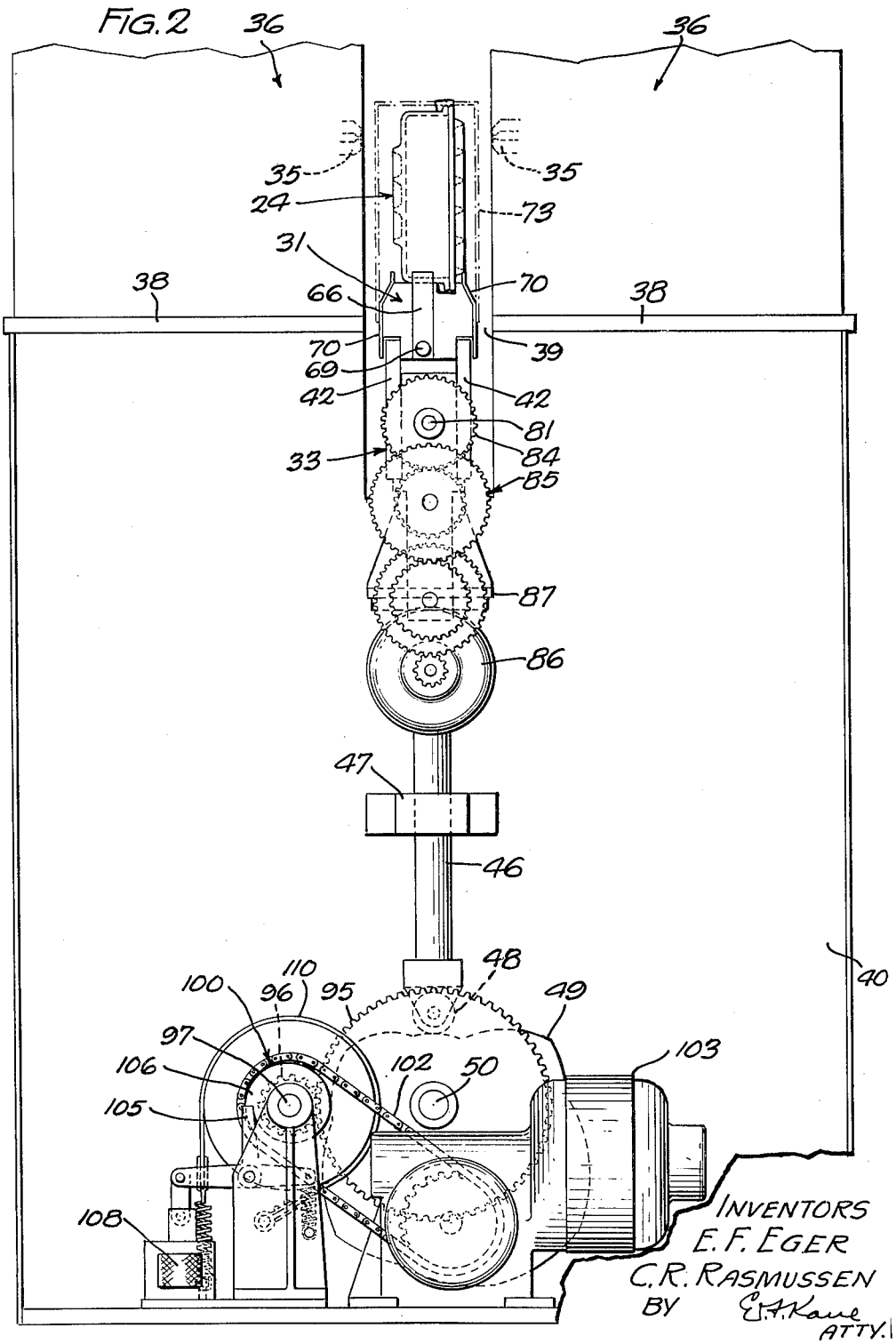

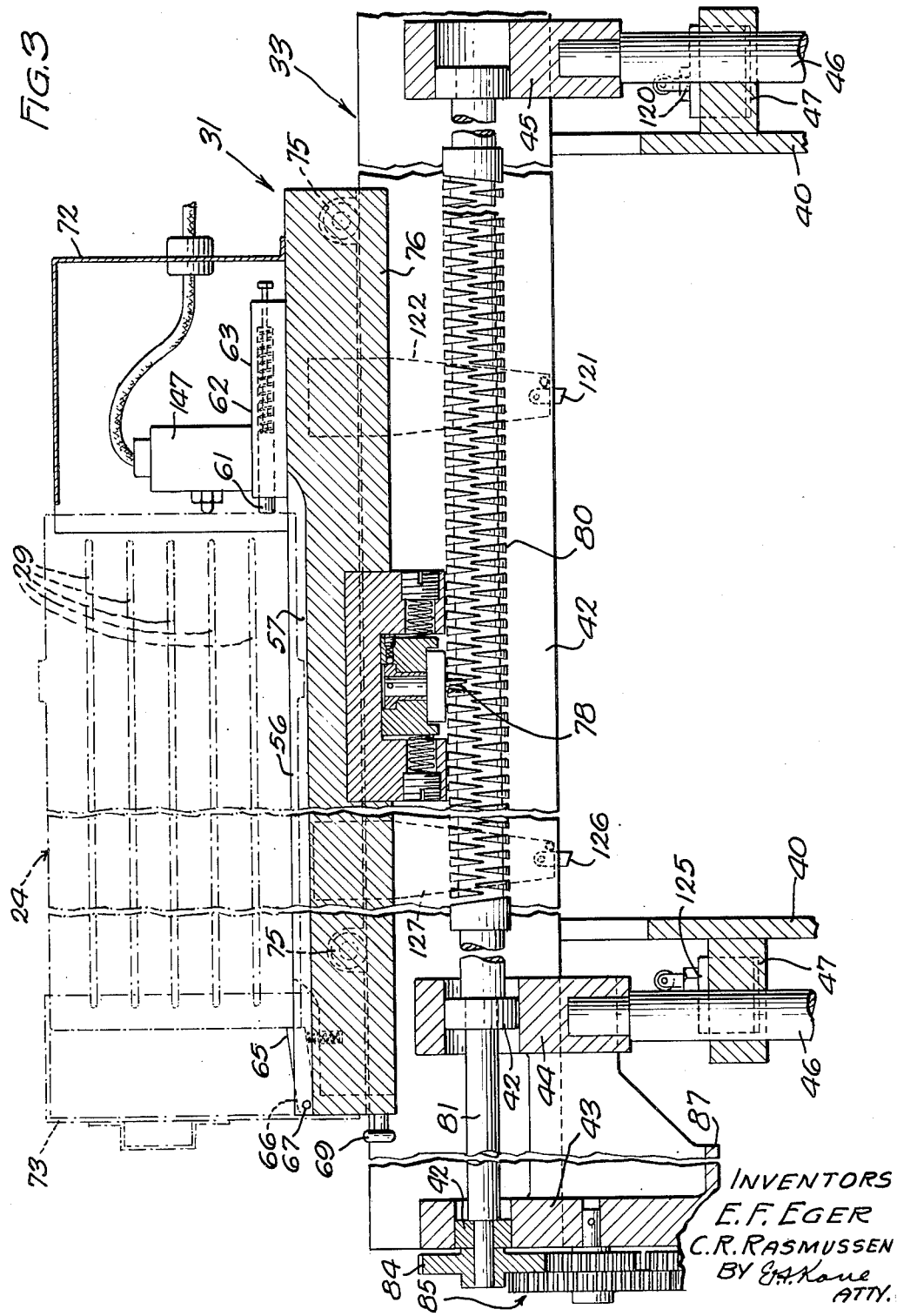

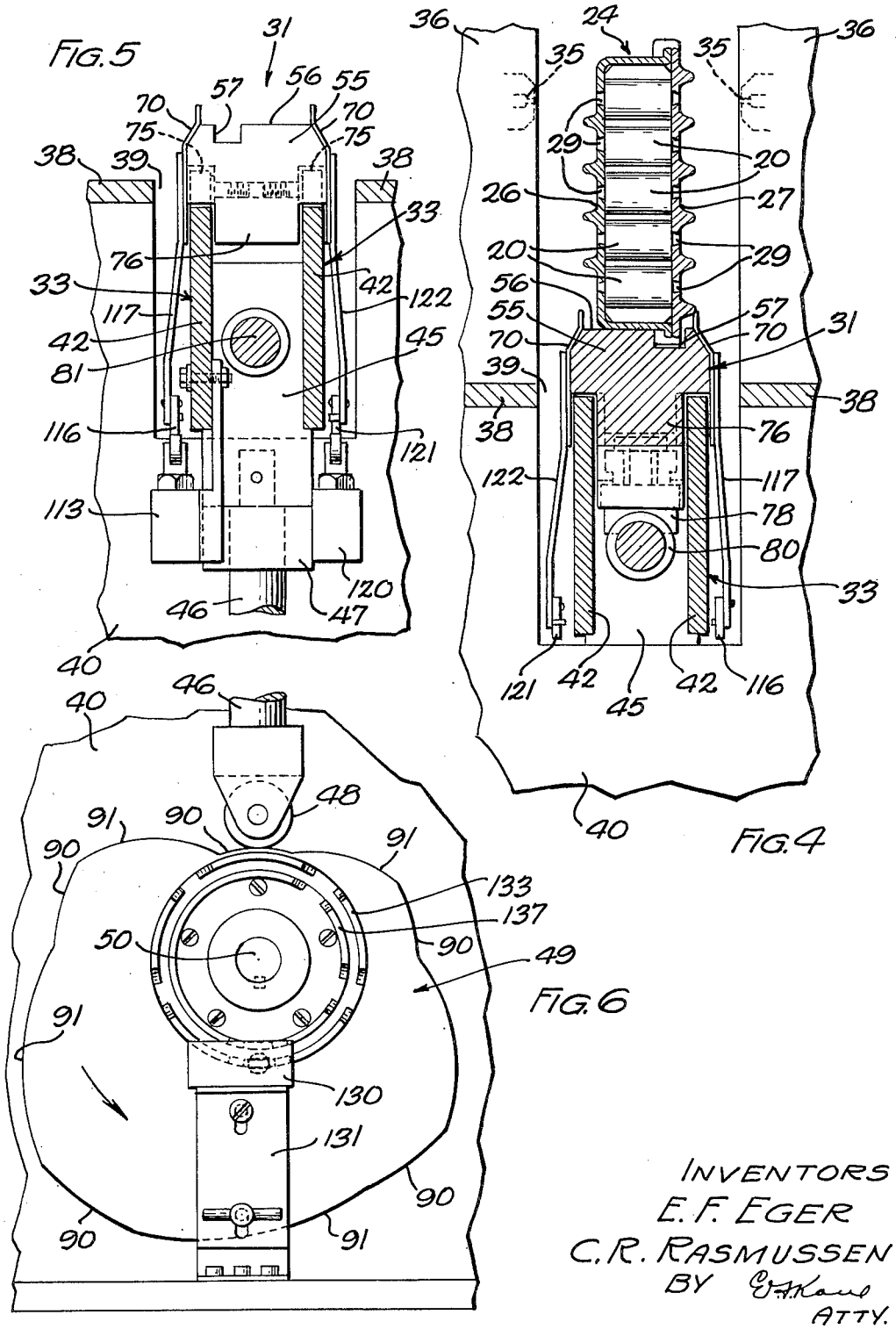

Dec. 23, 1952    E. F. EGER ET AL    2,622,554
APPARATUS FOR SPRAYING TERMINALS ONTO THE ENDS OF WOUND CONDENSERS
Filed March 30, 1950     5 Sheets-Sheet 5

INVENTORS
E. F. EGER
C. R. RASMUSSEN
BY D. F. Kane
ATTY.

Patented Dec. 23, 1952

2,622,554

UNITED STATES PATENT OFFICE 2,622,554

APPARATUS FOR SPRAYING TERMINALS ONTO THE ENDS OF WOUND CONDENSERS

Edward F. Eger, Chicago, and Clarence R. Rasmussen, La Grange, Ill., assignors to Western Electric Company, Incorporated, New York, N. Y., a corporation of New York Application March 30, 1950, Serial No. 152,935

11 Claims. (Cl. 118—6)

This invention relates to a spraying machine and more particularly to a spraying apparatus having mechanism for reciprocating a fixture in the path of a solder spray and for changing the level of said fixture for each reciprocation to spray molten solder onto portions of a plurality of condensers arranged in superposed rows in the fixture.

An object of the present invention is to provide an efficient and effective spraying machine for reciprocating a plurality of articles at different levels past a spray gun, and to automatically spray material onto the articles.

In accordance with one embodiment of the invention, the apparatus is provided with a stationary spray gun for directing a spray of molten solder in one direction, and has a carrier movable transversely to the direction of the spray for carrying a fixture into the path of the spray, the carrier being mounted for horizontal reciprocation through a predetermined distance on an elevator which is automatically raised or lowered at the end of each horizontal movement of the carrier to position the carrier and the fixture thereon at a plurality of different levels as it traverses said predetermined distance to cause the molten solder to be sprayed onto the ends of a plurality of condensers arranged in a plurality of parallel and superposed rows in the fixture and in alignment with a plurality of parallel slots in the wall in the fixture, through which portions of the end of the condensers are exposed.

Other objects and advantages of the invention will be apparent by reference to the following detailed description and the accompanying drawings illustrating a preferred embodiment thereof, in which:

Fig. 2 is an end elevational view of the apparatus shown in Fig. 1;

Fig. 3 is an enlarged longitudinal sectional elevational view of the portion of the spraying apparatus showing the carriage and elevator in changed positions;

Fig. 4 is a fragmentary vertical cross-sectional view of the apparatus taken on the line 4—4 of Fig. 1;

Fig. 5 is a detailed vertical cross-sectional view of a portion of the apparatus taken on the line 5—5 of Fig. 1;

Fig. 6 is a detailed elevational view of a portion of the apparatus indicated by the line 6—6 of Fig. 1 and showing the cams for raising and lowering the elevator and for actuating the spray gun control switch;

Figure 1:
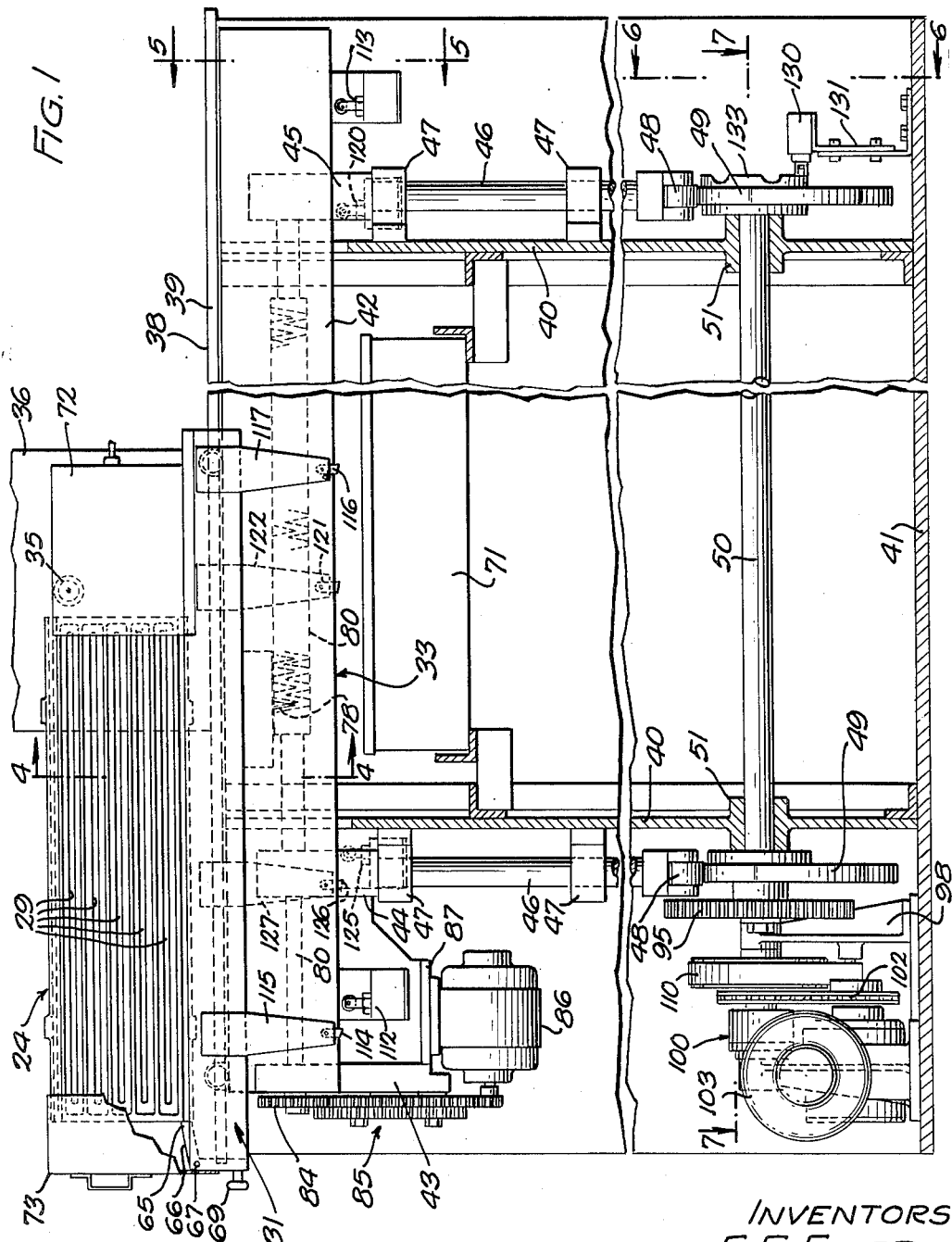
Fig. 1 is a vertical longitudinal sectional elevational view of the spraying apparatus showing the elevator in its lowermost position and the carriage with a condenser holding fixture thereon in its starting position on the elevator.
Figure 7:
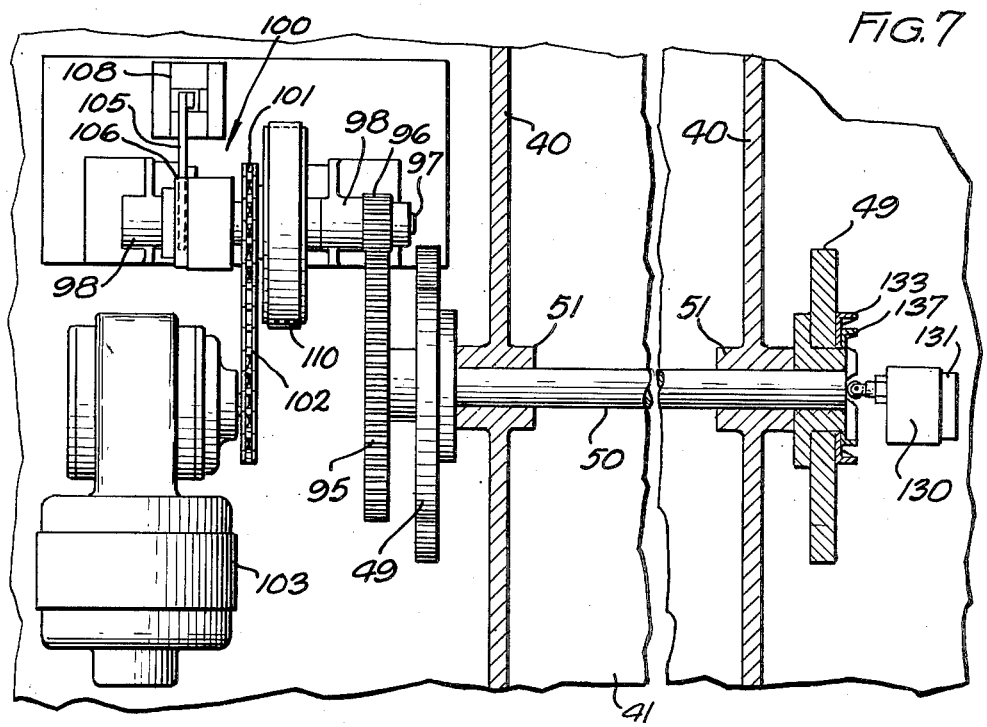
Fig. 7 is a plan sectional view taken on the line 7—7 of Fig. 1 with parts broken away.

This spraying apparatus is designed to spray molten solder onto predetermined portions of the ends of wound metallized paper condensers 20 to form terminals thereon, the condensers being arranged in rows with five rows of the condensers supported parallel and in laterally spaced relation to each other in a fixture 24. The fixture 24, which is illustrated in and forms the subject matter of a co-pending application of E. F. Eger, Serial No. 152,936, filed March 30, 1950, comprises, generally, a box-like structure having a pair of opposed walls 26—27 disposed in engagement with the ends of the condensers 20 and provided with a plurality of slots 29 aligned with the rows of condensers to expose predetermined portions of the ends thereof. With the condensers stacked therein, the fixture 24 is adapted to be positioned on a carriage 31, which is supported on an elevator 33 for horizontal reciprocable movement of predetermined length to carry the fixture between the nozzles 35—35 of a pair of stationary spray guns 36—36 disposed on opposite sides of the carriage 31. The guns 36 are mounted on a table 38 which is centrally slotted at 39 to accommodate the carriage 31 and the elevator 33, which is supported on a suitable frame including the vertical frame plates 40—40, which in turn are secured to a base 41.

The elevator 33, which comprises a pair of elongated plates or rails 42—42 secured in spaced relation to each other on opposite sides of spacer members or brackets 43, 44 and 45, is supported on a pair of vertical rods 46—46 connected at their upper ends to the members 44—45 and slidably mounted for vertical movement in a pair of guide brackets 47—47 fixed to the vertical frame plate 40. The rods 46, at their lower ends are provided with cam followers 48, which engage the upper peripheral surface of cams 49—49 secured to opposite ends of a shaft 50, which is journalled in bearings 51—51 of the frame members 40.

The carriage 31 comprises an elongated bar or member 55 having an upper surface or seat 56 engageable with a side wall of the fixture 24 for supporting the fixture 24 with slots 29 and the rows of condensers in horizontal relation, and having a longitudinally extending groove or recess 58 for receiving the laterally projecting flange portion of the fixture. The forward end of the fixture 24 is adapted to engage a plunger 61 mounted in a recess in a block 62 on the carriage, the plunger being stressed in one direction by a spring 63 to yieldably urge the fixture 24 against the end 65 of a bell crank latching member 66. Pivotally mounted 67 on the carriage, the latch member 66 is stressed for movement to its normal locking position by a spring 68 and has a handle 69, by means of which it may be oscillated to release the fixture 24 and permit its removal from the carriage.

Sheet metal guards 70, secured to the bar 55 and overhanging a portion of the rails 41, protect the carriage from the solder overspray during the spraying operation, and a pan 71 is positioned below the spray guns 36 to catch any solder which may drop from the fixture 24 or the guns. A relatively stationary sheet metal housing 72 is adapted to engage the rearwardly directed end portion of the fixture and mask a portion of the sides thereof, and a removable sheet metal cap or housing 73 is adapted to engage and mask a portion of the sides at the opposite end of the fixture. The carriage 31 is provided at each end with a pair of rollers 75—75, which engage the upper surface of the rails 44 to rollingly support the carriage thereon, and the bar or body member 55 is provided with a central portion 76 extending downwardly between the rails 44 to prevent lateral displacement of the carriage.

Drive means are provided for reciprocating the carriage 31 in a straight line on the rails 44 of the elevator through a predetermined distance to move the fixture past the spray nozzles 35 so that the entire row of condensers therein may cross the path of the spray. A nut element 78 pivotally connected to the carriage for oscillating movement about a vertical axis extends downwardly into operative engagement with a reversible lead screw 80 formed on a shaft 81 which is journalled in bearings 82—82 in the spacer members 43, 44 and 45. One end of the shaft extends beyond one end of the rails 41, and has a gear 84 secured thereon which meshes with, and is driven through a train of gears 85 from a motor 86 secured to a plate 87 formed integral with the spacer members 42 and 43. The motor 86, the gear train 85 and the reversible lead screw 80 are mounted on the elevator 83 for vertical movement therewith, and serve to reciprocate the carriage 31 and cause the fixture 24 to horizontally traverse the nozzles 35 at any of the various levels at which it may be positioned.

In the normal position of the apparatus at the beginning and at the end of each cycle of operation, the carriage 31 and the elevator 33 are in the position shown in Fig. 1 with the carriage moved to the left and the elevator moved to its lowermost level. In this starting position of the apparatus, a fixture 24 on the carriage 31 is in spaced relation to the spray nozzles 35 and has its uppermost slots 29 in horizontal alignment therewith, so that when the carriage 31 is moved horizontally through its first traverse in a rearward direction and the spray guns are operating, a double spray of molten metal will be directed through the slots 29 onto portions of the ends of the condensers in the row exposed by the uppermost slots 29. Drive means are provided to raise and lower the elevator 33 to move the fixture so that different ones of the five pairs of slots 29 therein are aligned with the nozzles 35 in a predetermined sequence. For this purpose, the cams 49—49 are provided with five pairs of cam and dwell surfaces 90 and 91, respectively, arranged equiangularly about the axis of the cam shaft 50, and with the dwell surface 91 spaced at various distances from the axis thereof, the cam being operable to raise the elevator 30 and to support it at five different levels.

Mechanism is provided to index the cam through an angular movement of one-fifth of a revolution after each horizontal traverse of the carriage 31. A relatively large spur gear 95 is fixed to one end of the cam shaft 50 and meshes with a small gear 96 keyed to a clutch shaft 97 which is journalled in the bearing brackets 98—98 supported on the base 41. The shaft 97 is fixed to one element of a one revolution clutch 100, another element of which is freely rotatable on the shaft 97 and has a sprocket 101 fixed thereon which is continuously driven through a chain 102 from a motor 103. A pivoted T-shaped trip member 105 is spring pressed to normal position to engage an element 106 of the one revolution clutch 100, and serves to retain the clutch in a normal inoperative or disengaged position. The trip member 105 is connected to a solenoid actuator 108 which, when energized, is adapted to withdraw the trip 105 to cause the shaft 97 to be driven through one revolution. A friction brake 110 constantly applied to the shaft 97 serves to prevent the overtravel of the cams 49. The gears 96 and 95 have a ratio of one to five, so that for each revolution of the shaft 97 and the gear 96, the cam shaft 50 and the cams 49 will be indexed one-fifth of a revolution, and will cause the movement either upwardly or downwardly of the elevator 33 and the carriage 31 with the fixture 24 thereon.

If the movement of the elevator 33 through a distance equal to that between adjacent slots 29 in the fixture 24 is designated as one step, it will be observed that the cams 49 are designed so that the elevator 33 and the fixture 24, in their initial position with the uppermost slots 29 in horizontal alignment with the nozzles 35, are raised one step in response to the first indexing movement of the cams in each cycle of operation to align the next to the uppermost slots 29 with the nozzles 35; in response to the second indexing movement, the elevator and fixture 24 are raised two steps to align the next to the lowermost slots 29 with the nozzles 35; in response to the third indexing movement, the elevator and the fixture are raised one step to align the lowermost slots with the nozzles 35; in response to the fourth indexing movement, the elevator and the fixture are lowered two steps to align the middle slots 29 with the nozzles 35; and in response to the fifth or last indexing movement of a complete cycle, the elevator 33 and the fixture 24 are lowered two steps and returned to their original level with the uppermost slots 29 horizontally aligned with the nozzles 35.

The solenoid 108 is actuated through a pair of switches 112 and 113 which are mounted on opposite ends of the rails 44 of the elevator for vertical movement therewith. The switch 112 is adapted to be actuated at the end of the advance of the carriage toward the rear of the machine by a trip member 114 pivotally mounted on an arm 115 secured to one side of the rear portion of the carriage 31, and the switch 113 is adapted to be actuated at the end of the return traverse of the carriage by a trip member 116 pivotally supported on an arm 117 fixed to one side of the forward portion of the carriage 31. A switch 120, stationarily mounted at the rear portion of the machine on the bearing bracket 47, is adapted to be actuated during the initial portion of the final return traverse of each cycle of operation of the carriage 31 by a trip member 121 pivotally mounted on a supporting arm 122 secured to the opposite side of the carriage 31 in spaced relation to the rear portion thereof to render the indexing mechanism and the spray guns 36 inoperative during the final return traverse of the carriage 31. A stop switch 125, stationarily mounted at the forward portion of the machine on the bearing bracket 147, is adapted to be actuated near the end of the final return traverse of each cycle of the carriage 31 by a trip member 126 pivotally mounted on a supporting arm 127 which is fixed to the other side of the carriage 31 in spaced relation to its forward end.

Electrical control means is provided to control the actuation of the spray guns 25 to operate the spray only when the fixture 24 traverses the spray nozzles 35 and presents a row of condensers in the path thereof. The control means includes a control switch 130 supported on a vertically adjustable bracket 131, which is mounted on the base 41 and supports the switch 130 in a position to be actuated by an annular cam 133 which is mounted on the face of the rear cam member 49 concentric with the axis of the shaft 50. The cam 133 has a series of five equally spaced cam lobes separated by recesses which cooperate to actuate the switch 130 in timed relation to the operation of the machine. The recesses in the cam 133 permit the normally closed switch 130 to return to its closed position to cause the actuation of the spray guns during the horizontal movement of the carriage past the nozzles 35, and the cam lobes operate to actuate the switch 130 to open position to render the spray guns inoperative during the raising and lowering of the fixture 24.

Under conditions when only three rows of condensers are supported in the fixture 24 in alignment with the uppermost, the middle and the lowermost slots 29 thereof, the switch 130 is adapted to be supported for actuation by another annular cam 137 mounted on the face of the cam 49. The cam 137 has a series of cam lobes adapted to open the switch 130 and render the spray guns inoperative during the indexing movements of the cams and during the horizontal movement of the carriage when the fixture thereon does not present a row of condensers in alignment with the spray nozzles.

Figure 8:
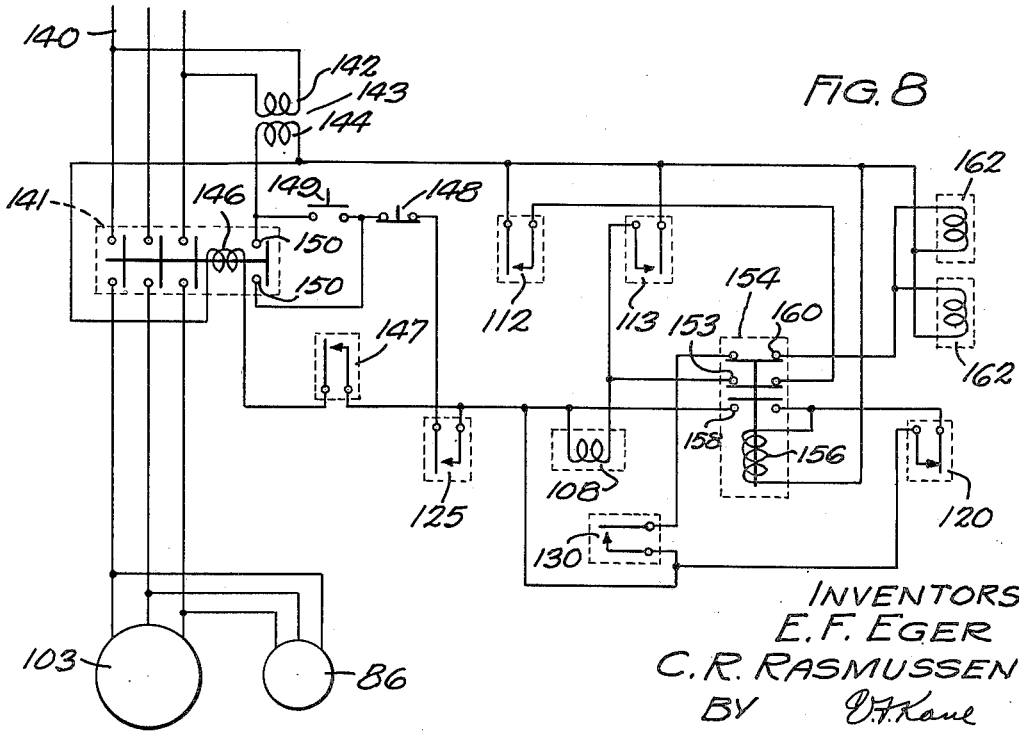
Fig. 8 is a wiring diagram of the spraying apparatus.

As indicated in the wiring diagram Fig. 8, the traversing motor 86 and the elevator motor 103 are connected to a power line 140 under control of a relay 141. The primary 142 of a transformer 143 is connected across the power line 140, and the secondary 144 of the transformer has one end thereof connected in series with the relay coil 146, a safety switch 147, the automatically operated stop switch 125, a manually actuable stop switch 148, which is connected through either a normally open manually actuable start switch 149 or a pair of normally open contacts 150 of the relay 141 to the other end of the primary 144. The normally open safety switch 147 is mounted on the carriage 31 and is adapted to be closed by engagement therewith of a fixture 24 properly positioned on the carriage 31. The normally open cam indexing switch 113 is connected to one lead of the secondary 144 of the transformer, and through the solenoid 108, the stop switch 125, the stop switch 148, and either the switch 149 or the contacts 150 to the other lead of the secondary. The normally open cam indexing switch 112 is connected to one lead of the secondary 144 and through a pair of normally closed contacts 153—153 of a relay 154, the coil of the solenoid 108, the stop switch 125, the stop switch 148 and either the switch 149 or the contacts 150 to the other lead of the secondary.

The relay 154 is actuated from a normal inoperative position to an operative position by a coil 156, one end of which is connected to one lead of the secondary and the other end of which is connected to one contact of the switch 120. The other contact of the switch 120 is connected through the stop switches 125, 148 and either the switch 149 or the contacts 150 to the other lead of the secondary 144 of the transformer. The other end of the coil 156 is also connected to one of a pair of normally open contacts 158, the other of which is connected through the switches 125, 148 and 149 or contacts 150 to the secondary of the transformer, the contacts 158 being closed in response to the actuation of the relay 154 by the closing of the switch 120 to provide a holding circuit for maintaining the relay in operative position after the opening of switch 120. One of a third pair of contacts 160 of the relay 154 is connected through a pair of solenoid coils 162—162, which are connected in parallel to each other, to one lead of the secondary 144, and the other contact 160 is connected through the switches 130, 125, 148 and 149 or contacts 150 to the other lead of the secondary 144. The solenoids 162—162 are associated with the spray guns 36—36 for controlling the actuation thereof.

In the operation of the machine, a fixture 24 filled with five rows of condensers in alignment with the slots 29 therein, is positioned on the carriage 31 and held in position by the latching member 66, after which the removable cover member 73 may be applied to the end of the fixture. With the fixture 24 in position on the carriage 31 as indicated in Fig. 1, the safety switch 147 is actuated to closed position and the operator may then depress the starting button or switch 149 to complete a circuit through, and energize the coil 146 of the relay 141 to actuate the relay and connect the motors 86 and 103 to the power line. The circuit through the solenoid valves 162—162 is also completed through the switch 130, which is closed at this time, normally closed switches 125 and 148 and contacts 150 to energize the solenoids and actuate the guns 36—36, and cause them to discharge a spray of molten solder from the nozzles 35—35 thereof. In response to the operation of the traversing motor 86, the lead screw 80 is caused to rotate, and the fixture 24 is advanced to the right as viewed in Fig. 1 through its first advance traverse to carry the uppermost row of condensers into the path of the solder spray issuing from the spray nozzles 35. As the carriage 31 approaches the end of its advance traverse, the trip member 116 actuates the normally open cam indexing switch 113 which completes the circuit through, and energizes the solenoid 108 to trip the one revolution clutch.

In response to the actuation of the one revolution clutch, the elevator cams 49 are indexed one increment to raise the elevator 33 and the fixture 24 one step to align the next to the uppermost slots of the fixture horizontally with the spray nozzles 35. During each of the indexing movements of the cams, the switch 130 is actuated to disconnect the solenoids 162—162 from the source of power and cut off the spray during the interval of vertical movement of the elevator 33 and the fixture 24. At the completion of each indexing movement of the cams, the switch 130 will be reclosed to reenergize solenoids 162. The fixture 24 with the next to the uppermost slots 29 thereof in horizontal alignment with the spray nozzles 35 is moved horizontally to the left as viewed in Fig. 1 on its return traverse to carry the row of condensers in alignment therewith past the line of spray issuing from the nozzle 35. As the carriage approaches the end of its return traverse, the trip member 114 actuates the normally open indexing switch 112, and closes the circuit through, and energizes the solenoid 108 to again index the cams 49 and cause the elevator 33 and the fixture 24 to be raised two steps to an elevation in which the slots 29 next to the lowermost slots of the fixture 24 are in horizontal alignment with the spray nozzles 35. The carriage 31 and the fixture 24 are then advanced toward the rear of the machine causing the molten solder to be sprayed through the slots 29 onto the exposed portions of the row of condensers aligned therewith, and near the end of this movement, the trip member 116 again actuates the indexing switch 113 to close the circuit through, and actuates solenoid 108 to again index the cams 49 and cause the elevator and the fixture 24 to be raised one step. The carriage 31 and fixture 24 are moved through a return traverse causing the molten solder to be sprayed onto the end portions of the row of condensers exposed through the lowermost slots 29 in the fixture, and as the carriage nears the end of its return traverse, the trip member 114 again actuates the indexing switch 112 to close the circuit through, and energize the solenoid 108 to trip the one revolution clutch and again index the cams 49 and cause the elevator and the fixture 24 to be lowered through two steps.

At this elevation of the fixture, the middle slots 29 are in alignment with the nozzles 35, and as the carriage and the fixture are moved toward the rear of the machine, the molten solder is sprayed through the slots 29 onto the exposed portions of the condensers in the row aligned therewith, and as the carriage approaches the end of its travel, the pivoted trip member 116 again actuates the indexing switch 113 which closes and energizes the solenoid 108 to trip the one revolution clutch, and again index the cams 49 to lower the elevator 33 and the fixture 24 to their initial and lowermost elevation. The carriage 31 and fixture are then moved on their final return traverse of the cycle of operation, and at the beginning of this return traverse, the trip member 121 actuates the normally opened switch 120 to closed position to complete the circuit through the relay coil 156 and cause the actuation of the relay 154. In response to the actuation of the relay 154, the circuit to the solenoids 162—162 controlling the spray guns is broken rendering the spray guns inoperative; the circuit to the indexing switch 112 is broken rendering the indexing means inoperative, and a holding circuit across the contacts 158 is established to maintain the relay in its operative position. As the carriage 31 approaches the end of its final return traverse, the trip member 126 actuates the closed switch 125 to open position to break the circuit to the relay coil 146 and disconnect the motors 86 and 103 from the power line terminating the cycle of operation of the machine. The momentum of the driving mechanism moves the carriage 31 a short distance after the motors have been disconnected from the power line, and causes the trip member 126 to disengage itself from the switch 125 and allows the switch to restore itself to its normally closed position. When the carriage 31 has come to rest, the fixture 24 with the solder sprayed condensers therein may be removed from the carriage, leaving the spraying machine in readiness for another spraying operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A spraying apparatus comprising a stationary spray gun, a carriage for holding articles to be sprayed, an elevator having rails for supporting said carriage for horizontal movement thereon to guide said articles in the path of spray from said gun, drive means for reciprocating said carriage, cam means for raising and lowering said elevator from and to a starting elevation and supporting said carriage at a plurality of elevations during the upward and the downward movement of the elevator in response to actuation of said cam means through successive increments, and drive means operable in response to the movement of said carriage in opposite directions for actuating said cam means through successive increments.

2. A spraying apparatus for spraying material onto a plurality of articles supported in a fixture comprising a carriage for holding said fixture and articles therein in predetermined position on the carriage, an elevator having guide means for supporting said carriage for horizontal reciprocable movement in a predetermined path, drive means on said elevator operatively connected to said carriage for reciprocating said carriage through a predetermined distance on said elevator, a spray gun stationarily mounted adjacent the path of travel of the fixture on said carriage operable for spraying material onto the articles moved into the path of spray, supporting means guiding said elevator for vertical movement, rotary cams for raising and lowering said elevator from and to a starting elevation and supporting said elevator in a plurality of elevations in a predetermined sequence in response to actuation thereof through successive increments, normally inoperative cam drive means for indexing said cams through successive increments, and control means operable in response to the movement in opposite directions of said carriage for rendering said cam drive means operable to index said cams through successive increments.

3. A spraying apparatus for spraying material onto a plurality of articles supported in a fixture comprising a carriage for holding said fixture and the articles therein in a predetermined position, an elevator having guide rails for supporting said carriage for horizontal reciprocation thereon, means for guiding said elevator for vertical movement, carriage drive means for reciprocating said carriage through a predetermined distance on said elevator, a spray gun stationarily mounted adjacent the path of movement of the fixture on said carriage and operable to spray material transversely to the direction of movement of said carriage onto the articles thereon, cam means for raising said elevator from and lowering said elevator to an initial level and for supporting said elevator at a plurality of levels in response to actuation of the cam means through successive increments, cam drive means including a clutch for indexing said cams through successive increments, control means operable at a predetermined point in the advance and return movements of said carriage to actuate said clutch to cause said cam drive means to index said cams through successive increments, and spray gun control means for rendering said spray gun operative during selected portions of the travel of said carriage.

4. An apparatus for spraying material onto a plurality of articles supported in a fixture comprising a carriage for holding said fixture and the articles therein in a predetermined position, an elevator having guide rails for supporting said carriage for horizontal reciprocation thereon, a reversible lead screw mounted on said elevator, drive means including a motor mounted on said carriage for rotating said lead screw, connector means on said carriage engaging said lead screw for imparting reciprocatory movement to said carriage in response to rotation of said lead screw, a spray gun, frame means stationarily mounting said spray gun adjacent the path of movement of said fixture on said carriage, said spray gun being adapted to spray material onto the articles in said fixture during the reciprocation thereof, guides on said frame means for guiding said elevator for vertical movement, cam followers on said elevator, a cam shaft mounted in said frame means, cams mounted on said cam shaft having a plurality of cam and dwell surfaces for raising and lowering said elevator from and to an initial starting level and supporting said elevator at a plurality of levels in a predetermined sequence in response to actuation of said cams through successive increments, normally inoperative drive means for indexing said cams through successive increments, and control means including a pair of elements mounted on said elevator and engageable with said carriage at predetermined points during the movement thereof in opposite directions for rendering said drive means operable to index said cams through successive increments.

5. An apparatus for spraying material onto a plurality of articles supported in a fixture comprising a carriage for holding said fixture and the articles therein in a predetermined position on said carriage, an elevator having guide rails for supporting said carriage for horizontal reciprocation thereon, a reversible lead screw mounted on said carriage, drive means including a motor mounted on said carriage for rotating said lead screw, connecting means on said carriage engaging said lead screw for imparting reciprocatory movement to said carriage through a predetermined distance in response to rotation of said lead screw, a spray gun, frame means stationarily mounting said spray gun adjacent the path of movement of said fixture on said carriage, said spray gun being adapted to spray material onto the articles in said fixture during the reciprocation thereof with said carriage, guides on said frame means for guiding said elevator for vertical movement, cam followers on said elevator, a cam shaft mounted in said frame means, cams mounted on said cam shaft having a plurality of cam surfaces and dwell surfaces for raising said elevator from and lowering said elevator to an initial starting elevation and supporting said elevator at a plurality of elevations in a predetermined sequence in response to actuation of said cams through successive increments, normally inoperative drive means for actuating said cam shaft and cams through successive increments, electrically actuated control means including a pair of switches mounted on said elevator and engageable with said carriage at predetermined points during the movement thereof in opposite directions for rendering said drive means operable to actuate said cams through successive increments, spray gun control means including a switch operable to actuate said gun, and cam means on said cam shaft for actuating said switch to cause the actuation of said spray gun in predetermined timed relation to the operation of said machine.

6. A spraying apparatus for spraying material onto a plurality of articles supported in the fixture comprising a spray gun, frame means mounting said spray gun in a fixed position, a carriage for supporting said fixture and the articles therein in a predetermined position on said carriage, an elevator having rails for supporting said carriage for horizontal movement thereon to guide the articles in the fixture past said spray gun, a reversible lead screw mounted on said elevator operatively connected to said carriage for reciprocating said carriage through an advance and a return traverse in response to the rotation of said lead screw, drive means including an electric motor mounted on said elevator for rotating said reversible lead screw, members on said frame means for guiding said elevator for vertical movement, cam followers on said elevator, a cam shaft mounted in said frame means, cams mounted on said cam shaft engageable with said cam followers and having portions thereof for raising and lowering said elevator to and from an initial elevation and supporting said elevator at a plurality of elevations in response to the indexing of said cams through successive increments, cam drive means including a continuously operating motor and a one revolution clutch operatively connected to said cam shaft for indexing said cams through successive increments, electrically actuated indexing control means including a pair of switches mounted on opposite ends of said elevator and actuable by said carriage in response to movement thereof in opposite directions operable to effect the actuation of said one revolution clutch and the indexing of said cams through successive increments, means including a switch actuable by said carriage during the initial portion of the return traverse at its initial elevation for rendering said indexing control means inoperable and said spray gun inoperable during the return traverse of said carriage at said initial elevation, and circuit means for connecting said motors to a source of power and including a switch actuable by said carriage at the end of its return traverse at its initial elevation for disconnecting said motors from said source of power.

7. An apparatus for spraying material onto a plurality of articles supported in a fixture comprising a carriage for holding the fixture and the articles therein in a predetermined position, an elevator having guide rails for supporting said carriage for horizontal reciprocation thereon, means for guiding said elevator for vertical movement, carriage drive means for reciprocating said carriage through a predetermined distance on said elevator in alternate advance and return movements, a spray gun stationarily mounted adjacent the path of movement of the fixture on said carriage and operable to spray material onto the articles moved into the path of said spray, rotatable cam means for raising said elevator from and lowering said elevator to a starting level and for supporting said elevator at a plurality of levels in response to actuation of said cam means through successive increments, normally inoperative drive means for actuating said cams through successive increments, control means including a pair of elements mounted on said elevator and engageable with said carriage at predetermined points during the advance and return movements thereof for rendering said drive means operative to actuate said cams through successive increments, spray gun control means for rendering said spray guns inoperative during the actuation of said cam means, and means including an element engageable with said carriage during the initial portion of the return movement of said carriage on said starting level to render said control means inoperative to effect the actuation of said cams and to render the spray gun inoperative during said return movement of said carriage on said starting level.

8. A spraying apparatus for spraying material onto a plurality of articles supported in a fixture comprising a carriage for holding said fixture and the articles therein in a predetermined position on said carriage, an elevator having guide rails for supporting said carriage for horizontal reciprocation thereon, means for guiding said elevator for vertical movement, carriage drive means on said elevator including a motor for reciprocating said carriage in alternate advance and return movements, a spray gun stationarily mounted adjacent the path of movement of a fixture on said carriage and operable to spray material onto the articles moved in the path of said spray, rotatable cam means engageable with said elevator and having portions for raising and lowering said elevator from and to an initial level and for supporting said elevator at a plurality of levels in a predetermined sequence in response to actuation of said cam means through successive increments, cam drive means including a motor and a normally disengaged clutch for indexing said cam means through successive increments, electrically actuated control means including a pair of switches mounted on said elevator and actuable by said carriage at predetermined points in its advance and return movements for effecting the engagement of said clutch and the indexing of said cam means through successive increments, spray gun control means operable in timed relation to the indexing of said cam means for rendering said spray guns operative during predetermined portions of the movements of said carriage, electrically actuated means including a switch actuable by said carriage during the initial portion of the return movement thereof on said initial level to render said spray gun inoperative and said electrically actuated control means inoperative during said return movement of the carriage, and circuit means operable for connecting said motor to a source of power and including a normally closed switch actuable by said carriage during the final portion of the return movement thereof on said initial level for disconnecting said motor from said source of power.

9. A spraying apparatus for spraying material onto a plurality of articles supported in a fixture comprising a carriage for holding said fixture and the articles therein in a predetermined position, an elevator having guide rails for supporting said carriage for horizontal reciprocation thereon, a reversible lead screw mounted on said elevator operatively connected to said carriage for reciprocating said carriage on said elevator through advance and return movements in response to rotation of said lead screw, drive means including a motor mounted on said carriage for rotating said lead screw, a spray gun, frame means mounting said spray gun adjacent the path of movement of a fixture on said carriage, said spray gun being adapted to spray material onto the articles in said fixture during the reciprocation thereof, guides on said frame means for guiding said elevator for vertical movement, cam followers on said elevator, a cam shaft mounted in said frame means, cams mounted on said cam shaft having a plurality of cam and dwell surfaces for raising and lowering said elevator from and to a starting level and supporting said elevator at a plurality of levels in a predetermined sequence in response to actuation of said cams through successive increments, normally inoperative drive means including an electric motor operable for actuating said cam shaft and said cams through successive increments, electrically actuated control means including a pair of switches mounted on said elevator and actuable by said carriage at predetermined points during the advance and return movements thereof for rendering said drive means operable to index said cams through successive increments, means including a cam mounted for rotation on said shaft and a switch actuable by said cam operable for rendering said spray guns alternately operative and inoperative in timed relation to the actuation of said carriage, means including a switch actuable by said carriage during the initial portion of the return movement thereof at said starting level for rendering said indexing means and said spray gun inoperative during the return movement of said carriage at said starting level, and circuit means for connecting said motor to a source of current and including a switch actuable by said carriage during the final portion of the return movement of said carriage at said starting level for disconnecting said motor from said source of current.

10. A spraying apparatus comprising a stationary spray gun, a carriage for holding articles to be sprayed arranged in a plurality of levels on said carriage, an elevator having rails for supporting said carriage for horizontal movement thereon, drive means for reciprocating said carriage past said gun, means for raising and lowering said elevator and said carriage successively through a plurality of elevations during the upward and the downward movement of the elevator to position the articles at the various levels on said carriage for movement through the path of spray from said gun, and control means operable in response to the movement of said carriage in opposite directions for causing the actuation of said last means to move said carriage through successive elevations.

11. A spraying apparatus comprising a stationary spray gun, a carriage for holding articles to be sprayed arranged in a plurality of levels on said carriage, an elevator having rails for supporting said carriage for horizontal movement thereon, drive means for reciprocating said carriage past said spray gun, means for raising and lowering said elevator and said carriage to a plurality of elevations during the upward and the downward movement of the elevator to position the articles at the various levels on said carriage successively in horizontal alignment with sid spray gun for movement through the path of spray from said gun, control means operable in response to the movement of said carriage in opposite directions for causing the actuation of said means for raising and lowering said elevator through successive elevations, and spray gun control means for rendering said spray gun operative during selected portions of the travel of said carriage.

EDWARD F. EGER.
CLARENCE R. RASMUSSEN.

REFERENCES CITED

The following references are of record in the file of this patent:

UNITED STATES PATENTS

| Number | Name | Date |
|---|---|---|
| 122,945 | Gschwind | Jan. 23, 1872 |
| 1,894,729 | Bozarth | Jan. 17, 1933 |
| 1,966,093 | Griffin | July 10, 1934 |
| 2,212,576 | Teodonno | Aug. 27, 1940 |
| 2,252,432 | Klammt | Aug. 12, 1941 |
| 2,275,437 | Hopkins | Mar. 10, 1942 |